United States Patent
Sun et al.

(10) Patent No.: US 8,737,513 B2
(45) Date of Patent: May 27, 2014

(54) APPARATUS AND METHOD FOR JOINTLY SELECTING PRECODING MATRICES IN A MIMO MULTI-FLOW SYSTEM

(75) Inventors: Haitong Sun, San Diego, CA (US); Danlu Zhang, San Diego, CA (US); Sharad Deepak Sambhwani, San Diego, CA (US); Rohit Kapoor, San Diego, CA (US); Arjun Bharadwaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 13/558,588

(22) Filed: Jul. 26, 2012

(65) Prior Publication Data

US 2013/0121431 A1    May 16, 2013

Related U.S. Application Data

(60) Provisional application No. 61/558,590, filed on Nov. 11, 2011.

(51) Int. Cl.
*H04B 7/02* (2006.01)

(52) U.S. Cl.
USPC ........... 375/267; 375/260; 375/271; 375/295; 375/316; 375/342

(58) Field of Classification Search
USPC ......... 375/260, 261, 262, 267, 271, 279, 290, 375/295, 296, 299, 316, 320, 322, 336, 375/340–346, 350
See application file for complete search history.

(56) References Cited

U.S. PATENT DOCUMENTS

| | | | |
|---|---|---|---|
| 8,532,684 B2 * | 9/2013 | Chien et al. | 455/501 |
| 8,565,682 B1 * | 10/2013 | Gomadam et al. | 455/63.1 |
| 2010/0273514 A1 * | 10/2010 | Koo et al. | 455/501 |
| 2011/0211547 A1 | 9/2011 | Kim et al. | |
| 2012/0034874 A1 | 2/2012 | Yiu et al. | |
| 2012/0077511 A1 | 3/2012 | Shin et al. | |
| 2012/0250550 A1 * | 10/2012 | Gomadam et al. | 370/252 |
| 2013/0094604 A1 * | 4/2013 | Mondal et al. | 375/295 |
| 2013/0114455 A1 * | 5/2013 | Yoo et al. | 370/252 |
| 2013/0121431 A1 * | 5/2013 | Sun et al. | 375/267 |
| 2013/0121439 A1 * | 5/2013 | Zhu et al. | 375/296 |
| 2013/0208706 A1 * | 8/2013 | Hultell et al. | 370/336 |
| 2013/0273931 A1 * | 10/2013 | Lunttila et al. | 455/452.2 |

FOREIGN PATENT DOCUMENTS

WO      2011044668 A2    4/2011

OTHER PUBLICATIONS

Ericsson et al: "Supported configurations for Multi-Flow HSDPA Transmissions", 3GPP Draft; R1-114287, Nov. 9, 2011.
ETRI: "Multi-cell PMI coordination for downlink CoMP", 3GPP Draft; R1-094313, Oct. 12, 2009.

(Continued)

*Primary Examiner* — Hirdepal Singh
(74) *Attorney, Agent, or Firm* — Darren M. Simon

(57) ABSTRACT

An apparatus and a method are disclosed for jointly selecting precoding matrices for a plurality of received transmissions, such as those that might be received from a primary serving cell and a secondary serving cell in a multi-flow radio access network wherein each of the serving cells is configured to provide a MIMO transmission. Here, by jointly selecting the precoding matrices, interference from each of the downlink transmissions upon the other transmission can be reduced, thus improving overall performance at the receiving entity.

27 Claims, 11 Drawing Sheets

(56) References Cited

OTHER PUBLICATIONS

Fujitsu: "Precoding for geographically separated antennas and related codebook", 3GPP Draft; R1-113463, Oct. 5, 2011.
International Search Report and Written Opinion—PCT/US2012/063684—ISA/EPO—Feb. 14, 2013.
Yang, et al., "Efficient multi-point transmission scheme for HSDPA networks," 2011 IEEE Vehicular Technology Conference, 5 pages.
Zhang, et al., "Performance gains of single-frequency dual-cell HSDPA," Proceedings of 2011 IEEE Global Telecommunicaitons Conference, pp. 1-6.

* cited by examiner

APPARATUS AND METHOD FOR JOINTLY SELECTING PRECODING MATRICES IN A MIMO MULTI-FLOW SYSTEM

CROSS-REFERENCE TO RELATED APPLICATIONS

This application claims priority to and the benefit of provisional patent application No. 61/558,590, entitled, "SYSTEM AND METHOD FOR MULTI-FLOW HSDPA WITH MIMO SINGLE-STREAM BEAMFORMING" and filed in the United States Patent and Trademark Office on Nov. 11, 2011, the entire content of which is incorporated herein by reference.

BACKGROUND

1. Field

Aspects of the present disclosure relate generally to wireless communication systems, and more particularly, to downlink MIMO transmissions in a multi-flow radio access network.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As an example, multi-flow HSDPA has been recently introduced, in which multiple cells can independently provide high-speed downlinks to a mobile station, such that the mobile station is capable of aggregating the transmissions from those cells.

MIMO service, which includes single-stream downlink transmissions enabled for beamforming, has also been available for single-cell HSDPA.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides for the selection of precoding matrices for use by multiple cells, each of which is configured to transmit a MIMO downlink stream. The multiple MIMO transmissions from the respective cells may then be aggregated at a UE, for example, in a multi-flow HSDPA system.

Here, the selection of the precoding matrices for each cell takes into account the interference caused by the transmission of a particular MIMO downlink, on other cells transmitting a MIMO downlink to be aggregated at the UE. In addition, the selection of the precoding matrices for each cell may take into account the sum spectral efficiency for each of the downlinks being transmitted.

In one aspect, the disclosure provides a method of wireless communication operable at a user equipment. Here, the method includes receiving a first MIMO transmission from a first cell, receiving a second MIMO transmission from a second cell, determining a first characteristic of the first MIMO transmission and a second characteristic of the second MIMO transmission; and jointly selecting a first precoding matrix associated with the first cell and a second precoding matrix associated with the second cell, in accordance with the first characteristic and the second characteristic.

Another aspect of the disclosure provides a user equipment configured for operation in a wireless communication network. Here, the user equipment includes means for receiving a first MIMO transmission from a first cell, means for receiving a second MIMO transmission from a second cell, means for determining a first characteristic of the first MIMO transmission and a second characteristic of the second MIMO transmission, and means for jointly selecting a first precoding matrix associated with the first cell and a second precoding matrix associated with the second cell, in accordance with the first characteristic and the second characteristic.

Another aspect of the disclosure provides a user equipment configured for operation in a wireless communication network. Here, the user equipment includes at least one processor, a receiver coupled to the at least one processor, and a memory coupled to the at least one processor. The at least one processor is configured to receive a first MIMO transmission from a first cell, to receive a second MIMO transmission from a second cell, to determine a first characteristic of the first MIMO transmission and a second characteristic of the second MIMO transmission, and to jointly select a first precoding matrix associated with the first cell and a second precoding matrix associated with the second cell, in accordance with the first characteristic and the second characteristic.

Another aspect of the disclosure provides a computer program product, including a computer-readable storage medium configured for operation at a user equipment. Here, the computer-readable storage medium includes instructions for causing a computer to receive a first MIMO transmission from a first cell, instructions for causing a computer to receive a second MIMO transmission from a second cell, instructions for causing a computer to determine a first characteristic of the first MIMO transmission and a second characteristic of the second MIMO transmission, and instructions for causing a computer to jointly select a first precoding matrix associated with the first cell and a second precoding matrix associated with the second cell, in accordance with the first characteristic and the second characteristic.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
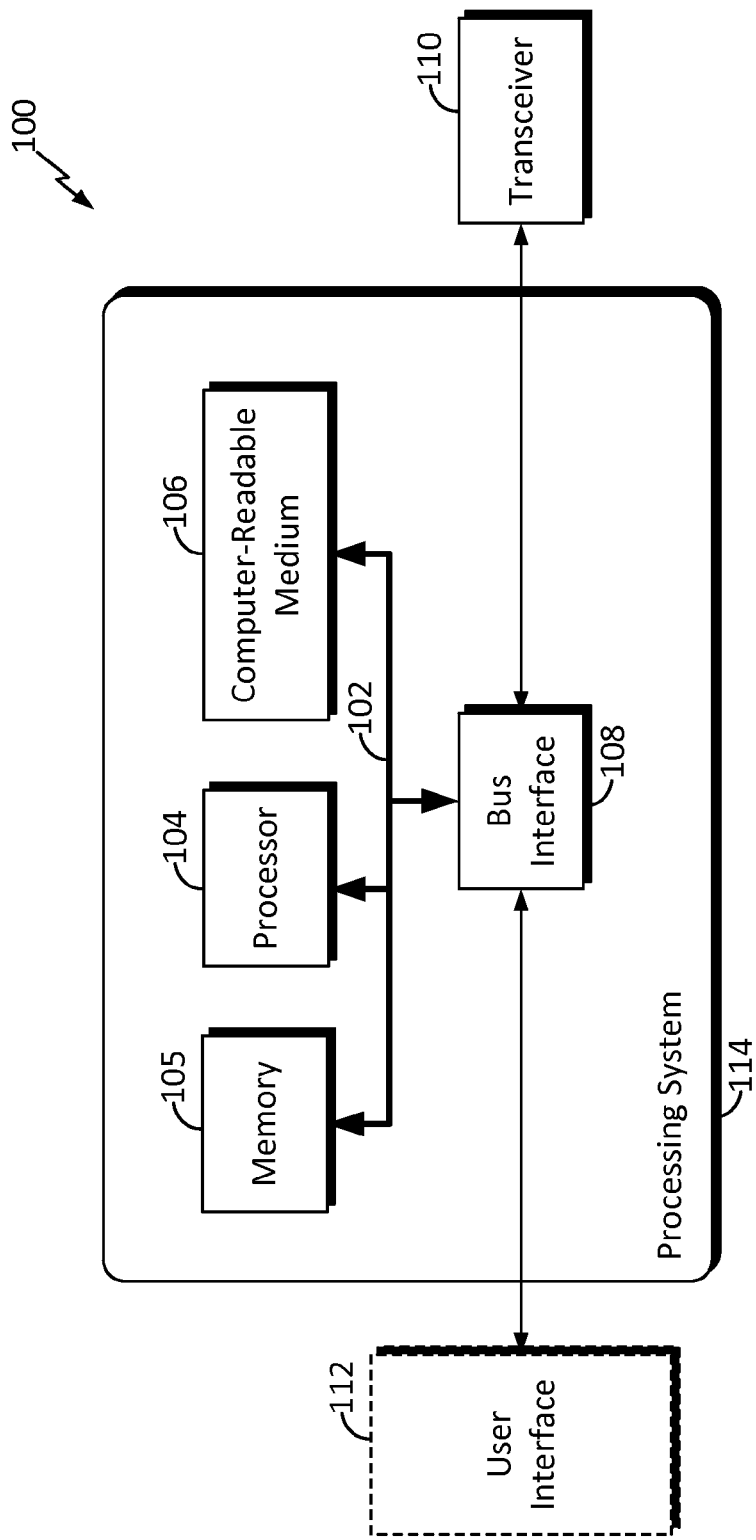
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
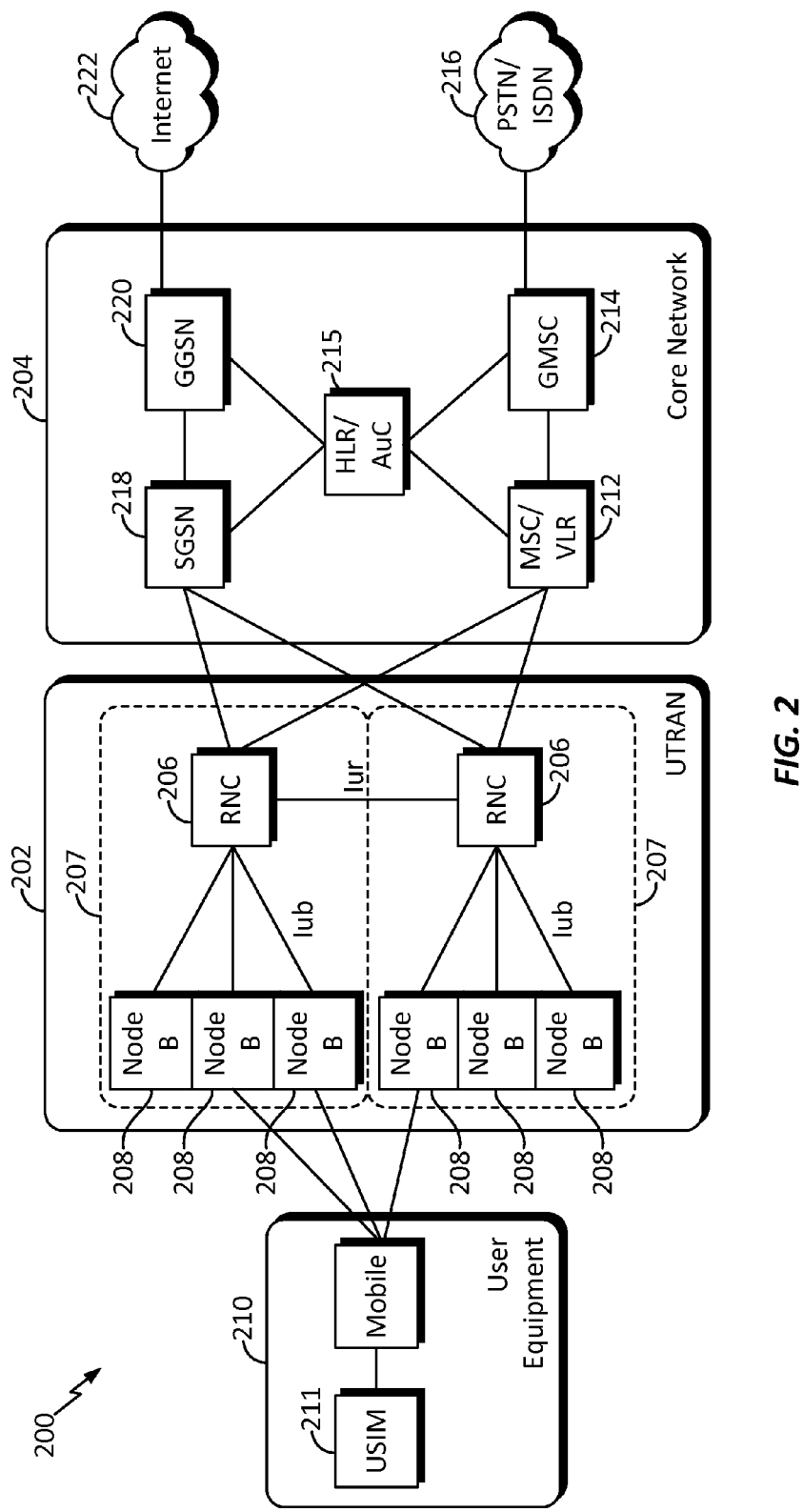
FIG. 2 is a block diagram conceptually illustrating an example of a telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

In a wireless telecommunication system, the communication protocol architecture may take on various forms depending on the particular application. For example, in the 3GPP UMTS system described above and illustrated in FIG. 2, the signaling protocol stack is divided into a Non-Access Stratum (NAS) and an Access Stratum (AS). The NAS provides the upper layers, for signaling between the UE 210 and the core network 204, and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 3:
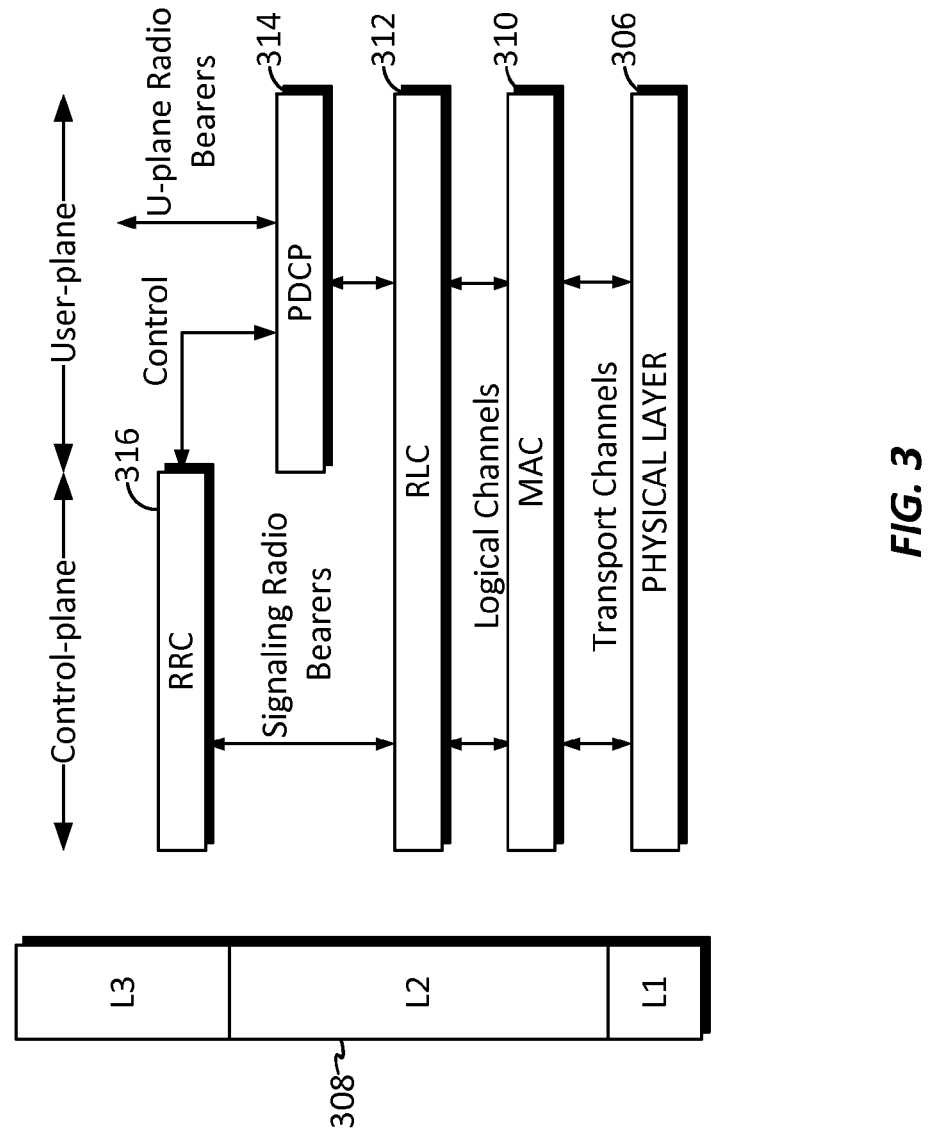
FIG. 3 is a conceptual diagram illustrating an example of a radio protocol architecture for the user and control plane.

Turning to FIG. 3, the AS is shown with three layers: Layer 1, Layer 2, and Layer 3. Layer 1 is the lowest layer and implements various physical layer signal processing functions. Layer 1 will be referred to herein as the physical layer 306. The data link layer, called Layer 2 308, is above the physical layer 306 and is responsible for the link between the UE 210 and Node B 208 over the physical layer 306.

At Layer 3, the RRC layer 316 handles the control plane signaling between the UE 210 and the Node B 208. RRC layer 316 includes a number of functional entities for routing higher layer messages, handling broadcasting and paging functions, establishing and configuring radio bearers, etc.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

Figure 4:
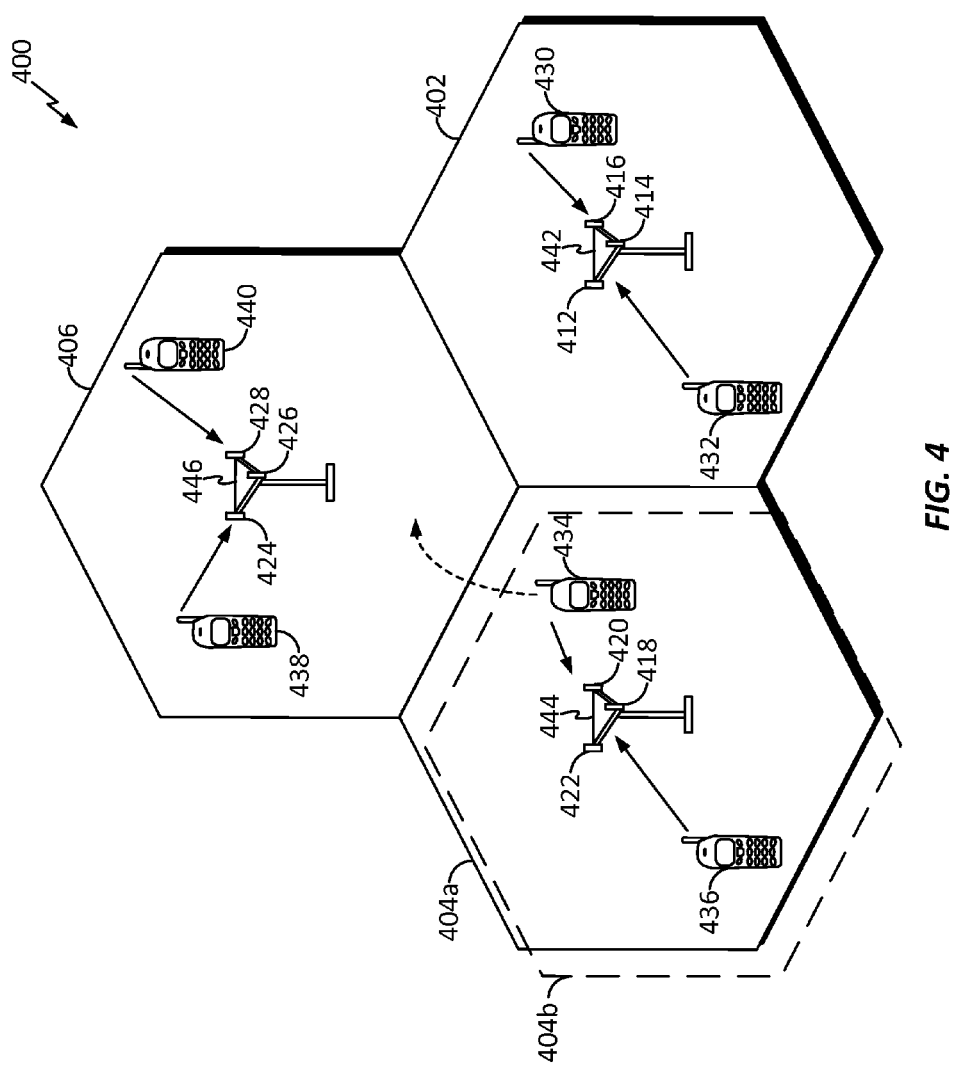
FIG. 4 is a conceptual diagram illustrating an example of an access network.

The UTRAN 202 is one example of a RAN that may be utilized in accordance with the present disclosure. Referring to FIG. 4, by way of example and without limitation, a simplified schematic illustration of a RAN 400 in a UTRAN architecture is illustrated. The system includes multiple cellular regions (cells), including cells 402, 404, and 406, each of which may include one or more sectors. Cells may be defined geographically (e.g., by coverage area) and/or may be defined in accordance with a frequency, scrambling code, etc. That is, the illustrated geographically-defined cells 402, 404, and 406 may each be further divided into a plurality of cells, e.g., by utilizing different scrambling codes. For example, cell 404a may utilize a first scrambling code, and cell 404b, while in the same geographic region and served by the same Node B 444, may be distinguished by utilizing a second scrambling code.

In a cell that is divided into sectors, the multiple sectors within a cell can be formed by groups of antennas with each antenna responsible for communication with UEs in a portion of the cell. For example, in cell 402, antenna groups 412, 414, and 416 may each correspond to a different sector. In cell 404, antenna groups 418, 420, and 422 may each correspond to a different sector. In cell 406, antenna groups 424, 426, and 428 may each correspond to a different sector.

The cells 402, 404, and 406 may include several UEs that may be in communication with one or more sectors of each cell 402, 404, or 406. For example, UEs 430 and 432 may be in communication with Node B 442, UEs 434 and 436 may be in communication with Node B 444, and UEs 438 and 440 may be in communication with Node B 446. Here, each Node B 442, 444, and 446 may be configured to provide an access point to a core network 204 (see FIG. 2) for all the UEs 430, 432, 434, 436, 438, and 440 in the respective cells 402, 404, and 406.

During a call with a source cell, or at any other time, the UE 436 may monitor various parameters of the source cell as well as various parameters of neighboring cells. Further, depending on the quality of these parameters, the UE 436 may maintain communication with one or more of the neighboring cells. During this time, the UE 436 may maintain an Active Set, that is, a list of cells to which the UE 436 is simultaneously connected (i.e., the UTRAN cells that are currently assigning a downlink dedicated physical channel DPCH or fractional downlink dedicated physical channel F-DPCH to the UE 436 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 408 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

A high speed packet access (HSPA) air interface includes a series of enhancements to the 3G/W-CDMA air interface between the UE 210 and the UTRAN 202, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI), a positive or negative acknowledgement (ACK/NAK) of a previous HS-DSCH transmission, and in instances utilizing MIMO and/or beamforming, a precoding control indication (PCI).

One difference on the downlink between Release-5 HSDPA and the previously standardized circuit-switched air-interface is the absence of soft handover in HSDPA. This means that HSDPA channels are transmitted to the UE from a single cell called the HSDPA serving cell. As the user moves, or as one cell becomes preferable to another, the HSDPA serving cell may change. Still, the UE may be in soft handover on the associated DPCH, receiving the same information from plural cells.

In Release 5 HSDPA, at any instance a UE 210 has one serving cell: the strongest cell in the active set as according to the UE measurements of $E_c/I_0$. According to mobility procedures defined in Release 5 of 3GPP TS 25.331, the radio resource control (RRC) signaling messages for changing the HSPDA serving cell are transmitted from the current HSDPA serving cell (i.e., the source cell) and not the cell that the UE reports as being the stronger cell (i.e., the target cell).

Release 7 of the 3GPP standards introduced various enhancements to the downlink, one of which includes the implementation of multiple-input, multiple-output (MIMO). MIMO is a term generally used to refer to a form of spatial multiplexing utilizing multiple antennas, i.e., multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream utilizing a suitable precoding matrix, and then transmitting each spatially precoded stream through a different transmit antenna on the downlink. Here, the precoding matrix may be a one-dimensional precoding vector or a matrix of any suitable number of dimensions. By virtue of the spatial difference between the transmit antennas, and accordingly, the different paths taken by the respective signals, the spatially precoded data streams arrive at the UE(s) 210 with different spatial signatures, enabling each of the UE(s) 210 to recover the one or more the data streams destined for that UE 210.

With this multi-antenna technology, spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Release 8 of the 3GPP standards introduced dual carrier HSDPA (DC-HSDPA), which enables a UE 210 to aggregate dual adjacent 5-MHz downlink carriers transmitted by a Node B 208. The dual carrier approach provides higher downlink data rates and better efficiency at multicarrier sites. Generally, DC-HSDPA utilizes a primary carrier and a secondary carrier, where the primary carrier provides the channels for downlink data transmission and the channels for uplink data transmission, and the secondary carrier provides a second set of HS-PDSCHs and HS-SCCHs for downlink communication. Here, the primary carrier is generally the best serving HS-DSCH cell according to the UE measurements of $E_c/I_0$.

As discussed above, DC-HSDPA provides for downlink carrier aggregation. The carrier aggregation achieved in 3GPP Release 8 DC-HSDPA and its subsequent enhancements provides benefits in terms of user experience, including latency reduction for bursty traffic.

Figure 5:
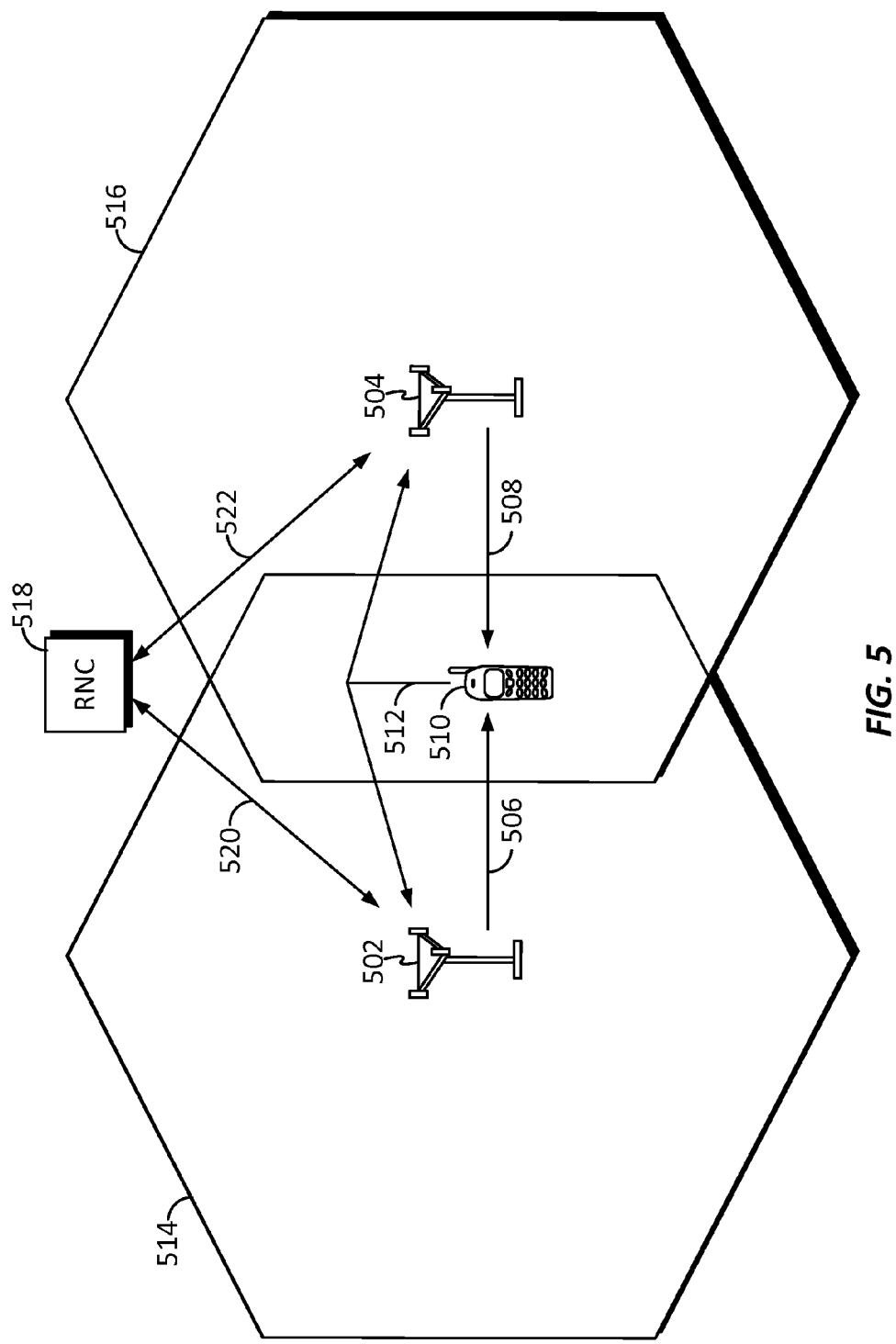
FIG. 5 is a conceptual diagram illustrating a portion of a multi-flow HSDPA network.

More recently, another form of aggregation, which may be referred to as soft aggregation, has been introduced into HSDPA. Soft aggregation provides for downlink aggregation wherein the respective downlinks come from different base stations. FIG. 5 illustrates an exemplary system for soft aggregation in accordance with some aspects of the present disclosure. In FIG. 5, there may be a geographic overlap between two or more cells 514 and 516, such that a UE 510 may be served, at least for a certain period of time, by the multiple cells. Here, referring again to FIG. 2, the UE 510 is one example of a UE 210 that may be utilized in a UMTS system 200 in accordance with some aspects of the present disclosure. That is, a wireless telecommunication system in accordance with the present disclosure may provide HSDPA service from a plurality of cells, such that a UE 510 may perform soft aggregation. Here, the UE 510 may aggregate downlinks from a primary serving cell 514 and at least one secondary serving cell 516. For example, a setup utilizing two or more cells may be referred to as multi-flow HSDPA (MF-HSDPA), coordinated multi-point HSDPA (CoMP HSDPA), or simply multipoint HSDPA. One particular configuration of a multi-flow HSDPA system that utilizes two cells transmitting respective HSDPA downlink carriers in the same frequency channel is sometimes referred to as single frequency dual cell HSDPA (SF-DC-HSDPA). However, other terminology may freely be utilized. In this example, users at cell boundaries, as well as the overall system, may benefit from a high throughput.

In the scheme illustrated in FIG. 5, two Node Bs 502 and 504 each provide downlink channels 506 and 508, respectively. The UE 510 receives and aggregates the downlink channels and provides an uplink channel 512, which may be received by one or both Node Bs 502 and 504. The uplink channel 512 from the UE 510 may provide feedback information (e.g., corresponding to the downlink channel state) for the corresponding downlink channels 506 and 508.

In accordance with an aspect of the present disclosure, a multi-flow HSDPA system such as the one illustrated in FIG. 5 may utilize MIMO transmissions on one or more of the downlink channels. For example, each of the downlink channels 506 and 508 may be a MIMO transmission.

Figure 6:
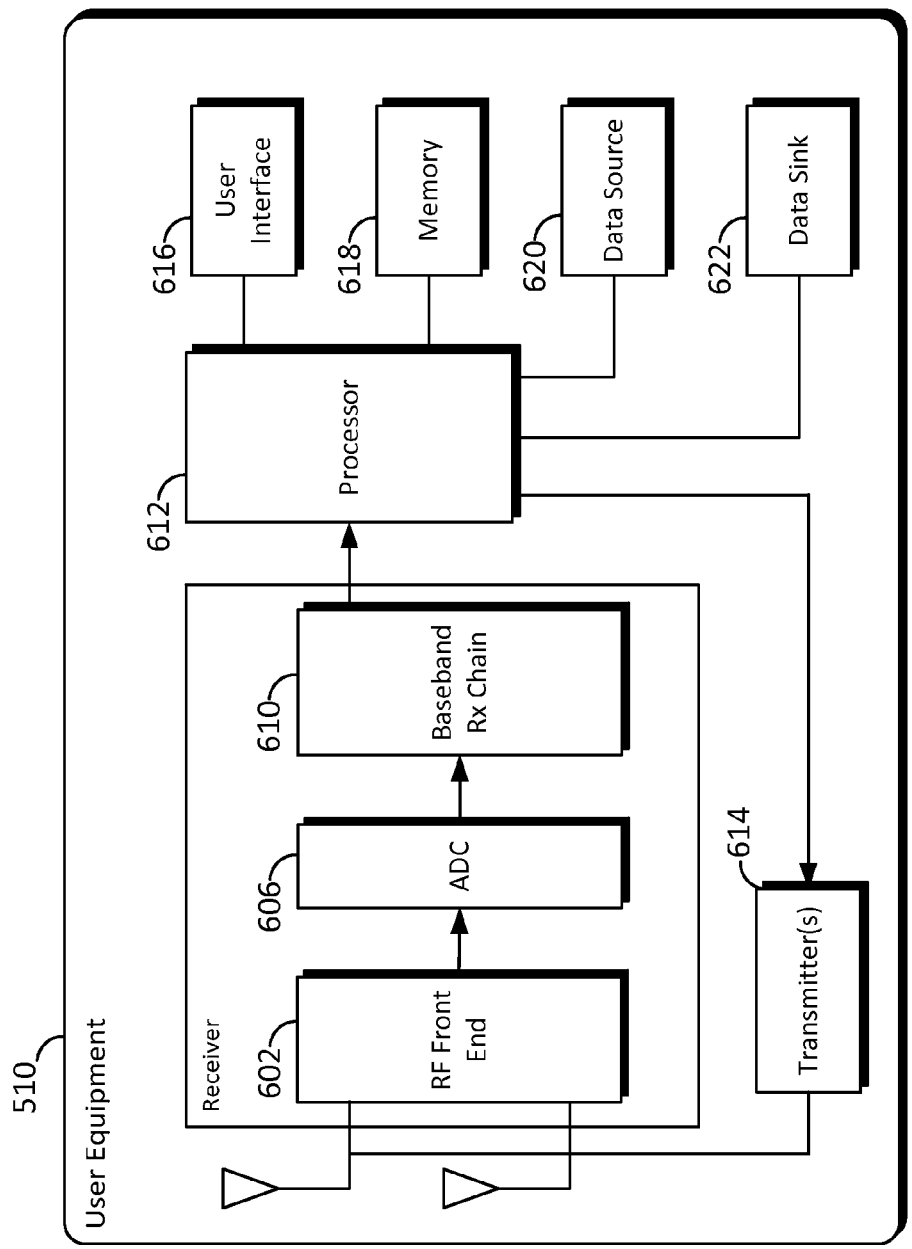
FIG. 6 is a block diagram conceptually illustrating an example of a UE in a telecommunications system according to one example.

FIG. 6 is a simplified block diagram illustrating some of the components of an exemplary UE 510 for use in a multi-flow HSDPA network in accordance with some aspects of the present disclosure. In the illustration, the UE 510 includes two antennas coupled to an RF front end 602 for removing the carrier frequency from the received signals. Of course, the example with two antennas is merely exemplary in nature, and a UE may include any suitable number of antennas within the scope of the present disclosure.

Coupled to the receive chain 602 may be an analog to digital converter 606, which may transform the received downlink channels to the digital domain to be further processed by a baseband RX chain 610. Here, the baseband processing at the Rx chain 610 may be joint, in the sense that it functions jointly on the signals received from both of the antennas. After baseband processing, one or more transport blocks may be provided to a processor 612 to be further processed in accordance with the received information. In some examples, the processor 612 may be the same as the processing system 114 illustrated in FIG. 1. The processor 612 may additionally be coupled to one or more transmitters 614, which may utilize one or more of the UE's antennas as managed by a suitable duplexer. Channel estimates, derived by the processor 612 from a reference signal transmitted by a Node B may be used to select an appropriate coding, modulation, spreading, and/or scrambling scheme for uplink transmissions by the one or more transmitters 614. Furthermore, feedback information relating to the received downlink transmissions may be generated by the processor 612 and transmitted by the one or more transmitters 614, including but not limited to acknowledgment information (e.g., corresponding to a HARQ process), precoding control information, and/or channel quality information, etc.

The processor 612 may additionally utilize a memory 618 for storing information useful for the processing of the information. The data source 620 may represent applications running in the UE 510, an input/output interface such as a USB interface, and/or various user interfaces such as the user interface 616 (e.g., a keyboard), etc. The data sink 622 may be any suitable sink for received data such as applications running in the UE 510, an input/output interface such as a USB interface, and/or various display devices, etc.

Figure 7:
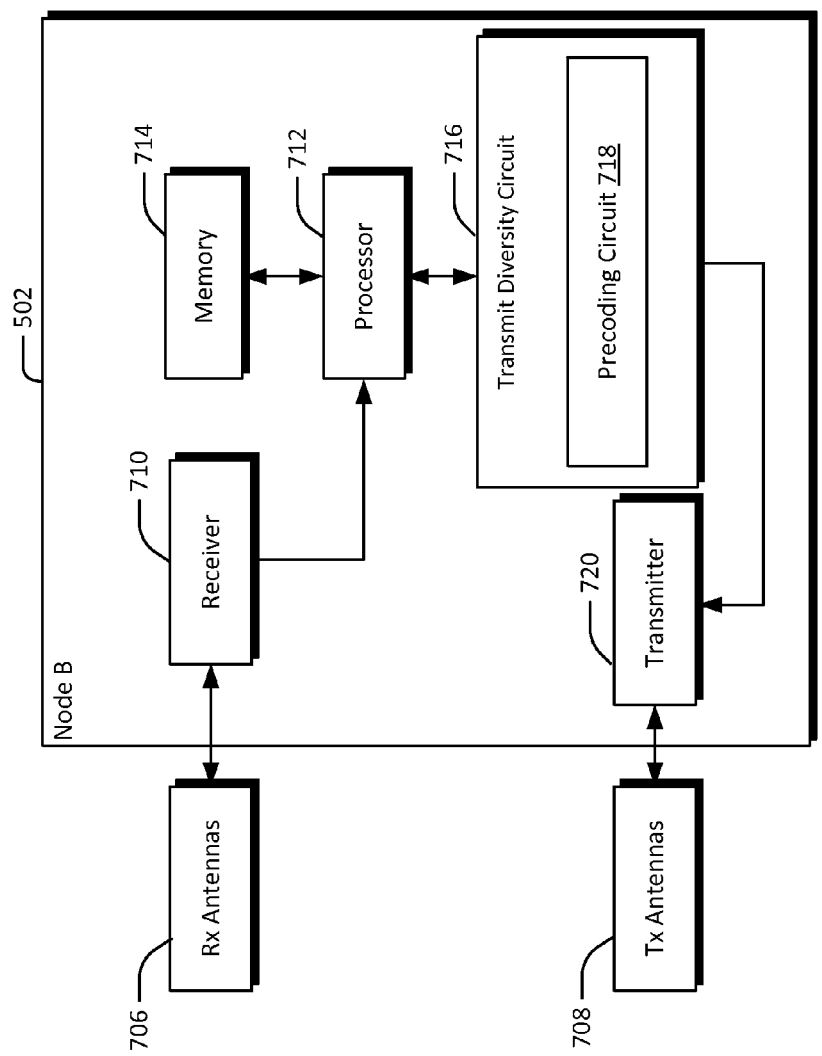
FIG. 7 is a block diagram conceptually illustrating an example of a Node B in a telecommunications system according to one example.

With reference now to FIG. 7, a simplified block diagram is provided of an exemplary Node B 502 according to some aspects of the present disclosure. Here, the components illustrated in FIG. 7 within the Node B 502 may be the same for Cell A 514 and for Cell B 516, or may vary in accordance with the particulars of a network implementation. In the illustrated example, the Node B 502 includes a receiver 710 for receiving signal(s) from one or more user devices through one or more receive antennas 706, and a transmitter 720 for transmitting to the one or more user devices through one or more transmit antennas 708. Here, when generating a MIMO transmission, the transmitter 720 is generally coupled to a plurality of transmit antennas 708. Receiver 710 may receive information from the receive antennas 706. Symbols may be analyzed by a processor 712, which may be similar to the processor(s) 104 or processing system 114 described above, and which may be coupled to a memory 714 for storing information related to wireless data processing. Processor 712 may further be coupled to a transmit diversity circuit 716, which may facilitate processing signals received from transmit diversity enabled user devices. In one aspect, the transmit diversity circuit 716 may generate MIMO transmissions to be transmitted to one or more user devices. In such an aspect, the transmit diversity circuit 716 may further include a precoding circuit 718 operable for precoding a MIMO transmission to be transmitted to the one or more user devices. Signals may be multiplexed and/or prepared for transmission by a transmitter 720 through one or more transmit antennas 708 to the user device.

In multi-flow operation, as described above and illustrated in FIG. 6, the UE 510 generally includes at least two receive chains 602 and 604, and may utilize an interference-aware receiver called a Type 3i receiver. That is, when the downlink carriers are in the same carrier frequency, such as in an SF-DC HSDPA system, the Type 3i receiver can effectively reject interference between the two cells, enabling the UE 510 effectively to separate the signals from the respective cells. Here, the performance improvements resulting from the downlink carrier aggregation in the SF-DC network can be dependent on the effectiveness of the interference rejection at the UE's receiver. Thus, improvements in the reduction of interference from one carrier on the reception of the other carrier, and vice-versa, can improve the aggregated throughput from both of the carriers.

When a network utilizing SF-DC additionally utilizes downlink MIMO from each of the primary and secondary serving cells 514 and 516, respectively, the precoding of the respective downlink MIMO streams can affect the performance of the receiver at the UE 510, and poor precoding matrix selection can adversely impact the interference between the serving cells at the UE.

In MIMO SF-DC operation, since the UE 510 might include only two receive antennas, the maximum multiplexing gain may be two. Here the maximum multiplexing gain may be determined according to the minimum number of transmit and receive antennas. Therefore, in this example, in accordance with some aspects of the present disclosure, each of the primary serving cell 514 and the secondary serving cell 516 may schedule single-stream transmissions with beamforming to the UE 510. That is, each of the primary serving cell 514 and the secondary serving cell 516 may utilize beamforming to transmit a single transport block in any particular TTI, rather than transmitting dual transport blocks utilizing MIMO on each stream.

Figure 8:
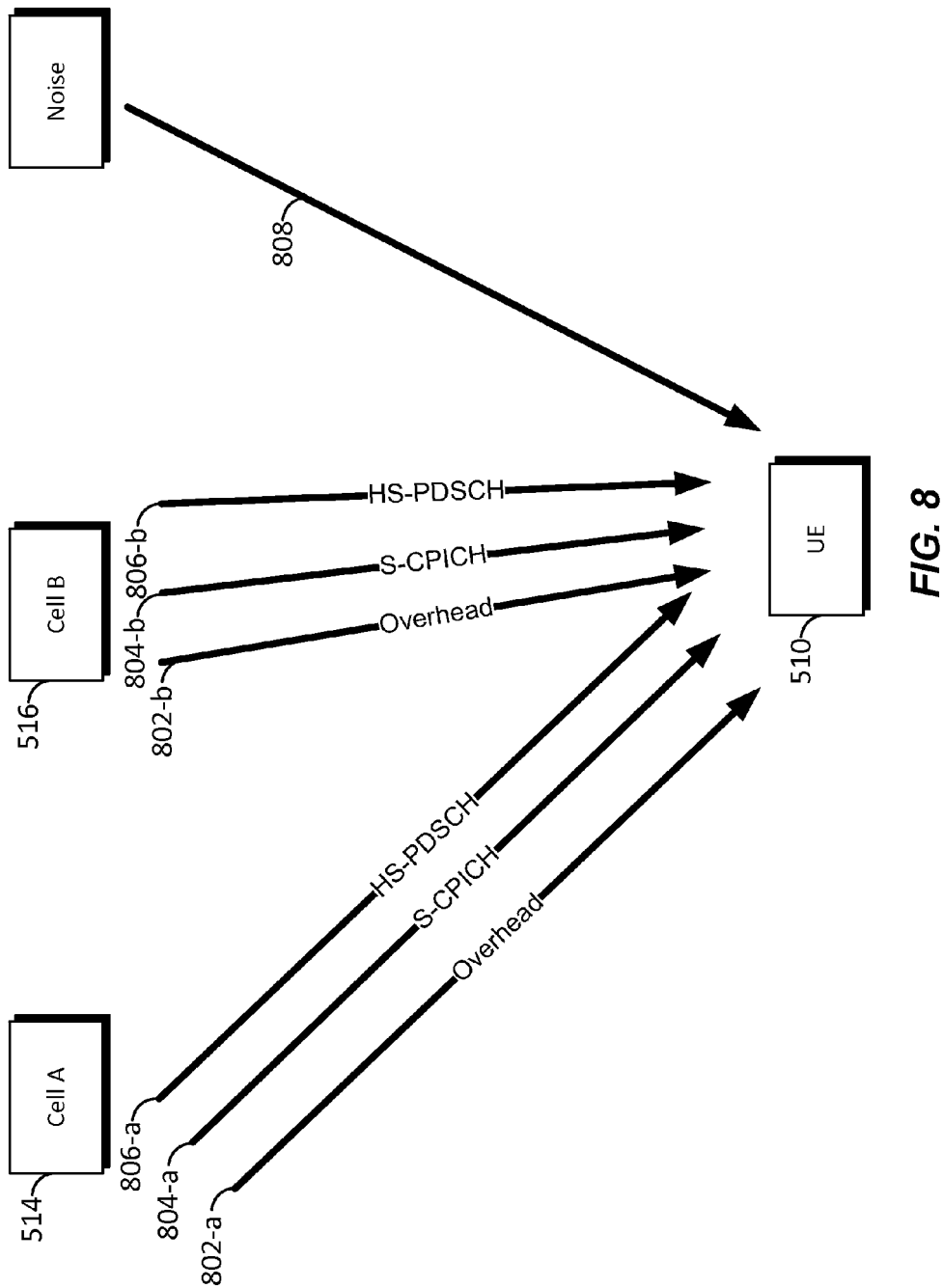
FIG. 8 is a conceptual block diagram illustrating a MIMO SF-DC system according to one example.

When MIMO (or beamforming) is configured for a particular cell, the interference structure generally becomes more complicated than during single-input, multiple-output (SIMO) operation without beamforming, since each Node B may transmit its power in different directions during MIMO operation. FIG. 8 is a simplified block diagram illustrating such a scenario utilizing MIMO or beamforming at a first cell designated Cell A, which may be the primary serving cell 514, and a second cell designated Cell B, which may be a secondary serving cell 516 in SF-DC operation, wherein each cell transmits a downlink utilizing two antennas. In this example, overhead channels 802-$a$ and 802-$b$ such as the common pilot channel (CPICH), the primary/secondary synchronization channel (SCH), and the primary common control physical channel (P-CCPCH) may be transmitted from a primary antenna, and one or more secondary common pilot channels (S-CPICH) 804-$a$ and 804-$b$ may be transmitted from a secondary antenna. The data 806-$a$ and 806-$b$, transmitted on the high-speed physical downlink shared channel (HS-PDSCH), may be beamformed utilizing a suitable precoding matrix and transmitted from both the first and second antennas.

As seen in the illustration of FIG. 8, the characteristics of the transmission from either cell (such as the selected precoding matrix) can affect not only the received energy at the UE 510 from that particular cell, but it can also interfere with the signal received at the UE 510 from the other cell.

In conventional downlink MIMO operation, selection of a precoding matrix for a transmission from a particular cell generally only considers how to maximize the received energy or signal-to-noise ratio (SNR) from that cell. That is, conventional selection of a precoding matrix generally does not take into consideration the interference that the beamformed transmission may cause to other cells. When the UE 510 is served by only one serving cell, this approach is sufficient. However, in accordance with an aspect of the present disclosure in which MIMO SF-DC is implemented, due to the interference caused between the two serving cells, the selection of the precoding matrix may be jointly performed, in order to improve the interference performance of the system.

To illustrate the selection of precoding matrices in accordance with some aspects of the present disclosure, a MIMO SF-DC system may be modeled by the following system equation:

$$\vec{y} = H^A(\vec{w}_o\sqrt{p_o}x_o^A + \vec{w}_s\sqrt{p_s}x_s^A + \vec{w}_d^A\sqrt{p_d}x_d^A) + H^B(\vec{w}_o\sqrt{p_o}x_o^B + \vec{w}_s\sqrt{p_s}x_s^B + \vec{w}_d^B\sqrt{p_d}x_d^B) + \vec{n}.$$

Here, the subscripts represent overhead (o) described above as signals 802-*a* and 802-*b*; the S-CPICH (s) described above as signals 804-*a* and 804-*b*; and data (d) described above as signals 806-*a* and 806-*b*. Further, the superscripts represent Cell A (A) described above as the primary serving cell 514; and Cell B (B) described above as the secondary serving cell 516.

$\vec{y}$ represents the 2 by 1 signal received at the UE 510. $H^A$ represents the 2 by 2 MIMO channel between Cell A 514 and the UE 510; and $H^B$ represents the 2 by 2 MIMO channel between Cell B 516 and the UE 510.

$$\vec{w}_o = \begin{bmatrix} 1 \\ 0 \end{bmatrix}$$

is a precoding matrix that may be utilized for the overhead channels 802-*a* and 802-*b* (e.g., CPICH, SCH, P-CCPCH, etc.), and $$\vec{w}_s = \begin{bmatrix} 0 \\ 1 \end{bmatrix}$$

is a precoding matrix that may be utilized for the S-CPICH 804-*a* and 804-*b*.

$\vec{w}_d^A$ represents the precoding matrix utilized for the data channel 806-*a* (HS-PDSCH) transmitted from Cell A 514, and $\vec{w}_d^B$ represents the precoding matrix utilized for the data channel 806-*b* (HS-PDSCH) transmitted from Cell B 516. Note that these precoding matrices are indexed per cell, indicating that different precoding matrices may be utilized for precoding the data channel transmitted from each respective cell.

In various aspects of the present disclosure, the selection of the precoding matrices $\vec{w}_d^A$ and $\vec{w}_d^B$ may be made by, or determined in accordance with, calculations performed at the UE 510, e.g., by way of the processor 612. That is, as described above, the UE 510 may utilize the transmitter 614 to transmit feedback on the HS-DPCCH, which may include a precoding control indication (PCI) that can be utilized at the base stations for $\vec{w}_d^A$ and $\vec{w}_d^B$.

$p_o$, $p_s$, and $p_d$ represent the power for the overhead 802, S-CPICH 804, and HS-PDSCH 806, respectively. In one example, $p_o=0.25$, $p_s=0.05$, and $p_d=0.7$. Of course, any suitable value may be utilized for the power levels.

$\vec{n}$ represents the 2 by 1 AWGN noise 808. In one example, each entry may have a noise variance of $\sigma_n^2$ to model the background noise including interference from all other cells, and thermal noise.

$x_0^A$, $x_s^A$, $x_d^A$, $x_0^B$, $x_s^B$, $x_d^B$ are chips corresponding to overhead 802, S-CPICH 804, and HS-PDSCH 806 that are transmitted from cells A and B, respectively, and are assumed to have unit energy.

In various aspects of the disclosure, the system equation given above may equally apply both to the case wherein virtual antenna mapping (VAM) is utilized, and to the case wherein VAM is not utilized for MIMO deployment. The utilization of VAM generally only changes the channel variables $H^A$ and $H^B$.

With the above system equation, an optimum linear minimum mean square error (MMSE) receiver may be computed for the detection of $x_d^A$ from Cell A 514, and $x_d^B$ from Cell B 516. Given the optimum linear receiver, the SNR of the data channel 806-*a* and 806-*b* may be expressed as:

$$SNR_d^A = p_d H^A \vec{w}_d^A \{H^B \vec{w}_o (H^B \vec{w}_o)^H p_o + H^B \vec{w}_s (H^B \vec{w}_s)^H p_s + H^B \vec{w}_d^B (H^B \vec{w}_d^B)^H p_d + \sigma_n^2 I\}^{-1} (H^A \vec{w}_d^A)_H,$$

and $$SNR_d^B = p_d H^B \vec{w}_d^B \{H^A \vec{w}_o (H^A \vec{w}_o)^H p_o + H^A \vec{w}_s (H^A \vec{w}_s)^H p_s + H^A \vec{w}_d^A (H^A \vec{w}_d^A)^H p_d + \sigma_n^2 I\}^{-1} (H^B \vec{w}_d^B)_H.$$

Here, I represents an identity matrix of size 2 by 2. With the SNR of the data channel 806 computed or estimated the HSDPA spectrum efficiency may be determined according to the turbo code, in order to determine the achievable spectrum efficiency for each beam selection.

In this example, the SNR and receiver design may be given for the case of a single path channel. However, within the scope of the present disclosure, it may be straightforwardly generalized to handle the multiple path channel as well. For the multipath channel, $H^A$ and $H^B$ represent the 2L by 2 on-time component of the MIMO channel, with L representing the equalizer length. The inter-chip interference may be absorbed in the noise term $\vec{n}$.

Figure 9:
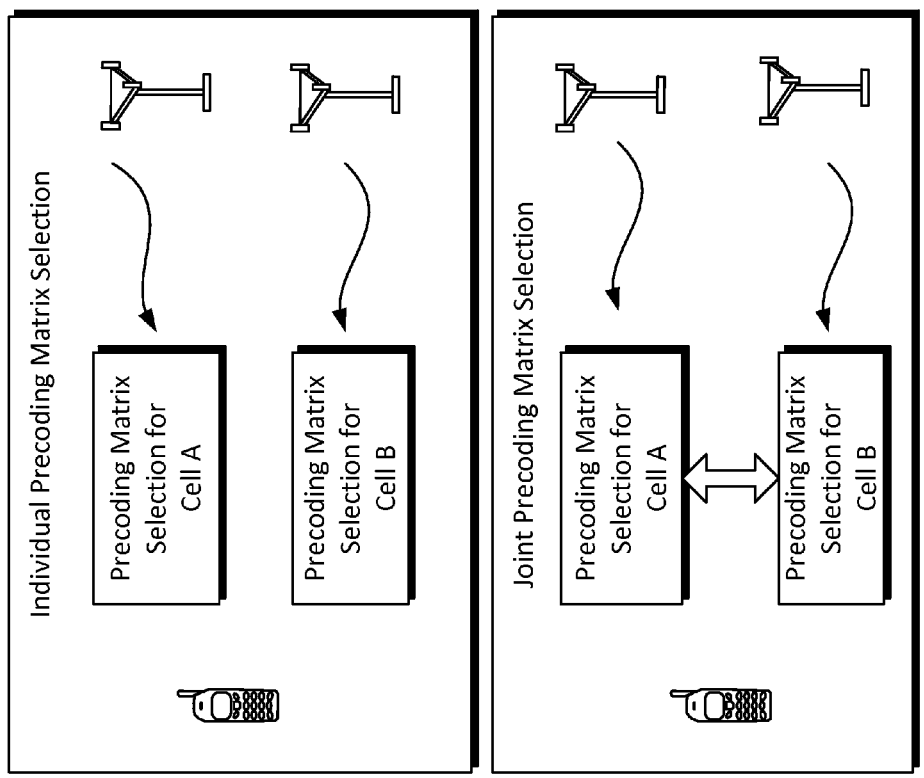
FIG. 9 is a conceptual diagram illustrating the difference between individual precoding matrix selection and joint precoding matrix selection according to one example.

In some aspects of the present disclosure, as illustrated in the top portion of FIG. 9, a MIMO SF-DC system may implement individual selection of precoding matrices $\vec{w}_d^A$ and $\vec{w}_d^B$. That is, while both Cell A 514 and Cell B 516 may transmit respective downlink signals to the UE 510 with MIMO single stream beamforming, the precoding matrices for the respective HS-PDSCHs, $\vec{w}_d^A$ and $\vec{w}_d^B$, may be independently chosen from among a plurality of possible MIMO single stream precoding matrices, in an effort to improve or maximize the SNR or received energy at the UE. That is, in this example, $$\vec{w}_d^A = \arg\max_{\vec{w}} (H^A \vec{w})^H H^A \vec{w},$$

and $$\vec{w}_d^B = \arg\max_{\vec{w}} (H^B \vec{w})^H H^B \vec{w}.$$

Here, each $\vec{w}$ may be selected from among the plurality of possible MIMO single stream precoding matrices.

In another aspect of the present disclosure, as illustrated in the bottom portion of FIG. 9, a MIMO SF-DC system may implement joint selection of the precoding matrices $\vec{w}_d^A$ and $\vec{w}_d^B$. Here, with both Cell A 514 and Cell B 516 serving the UE 510 utilizing single-stream beam forming, $\vec{w}_d^A$ and $\vec{w}_d^B$ may be jointly chosen among a plurality of possible pairs. In one nonlimiting example within the scope of the present disclosure, each cell may have four different possible MIMO single stream precoding matrices. In this example, a joint selection of both precoding matrices $\vec{w}_d^A$ and $\vec{w}_d^B$ from among all iterations of both cells leads to 16 different possibilities. Here, the joint design may choose the pair that provides the maximum sum spectral efficiency, when combining Cell A 514 and Cell B 516. Similarly, the joint design may choose the pair that optimizes a certain metric that corresponds to an aggregated throughput from the Cell A 514 and Cell B 516.

From the equations given above for computing the SNR, it can be seen that the SNR corresponding to each cell depends not only upon the precoding matrix selected for that cell, but also depends upon the precoding matrix utilized in the opposing cell. For example, the precoding matrix $\vec{w}_d^B$ selected for Cell B 516 affects not only the SNR of the data channel 806-*b* from Cell B 516, but it also affects the SNR of the data channel 806-*a* from Cell A 514. In fact, the precoding matrix selected for a particular cell affects the received energy, which is the numerator in the SNR computation, while the precoding matrix selected for the opposing cell affects the interference level, which serves as the denominator in the SNR computation.

Returning once again to FIG. 9, a simplified block diagram conceptually illustrates the difference between MIMO SF-DC utilizing individual precoding matrix selection, illustrated in the top portion, and MIMO SF-DC utilizing joint precoding matrix selection, illustrated in the bottom portion. That is, as seen in the top portion, individual precoding matrix selection lacks an interconnection between the precoding matrix selection for each respective cell; while, as seen in the bottom portion, joint precoding matrix selection includes such an interconnection between the precoding matrix selection for each respective cell.

Individual precoding matrix selection may correspond to a conventional MIMO precoding matrix design being utilized at each cell. That is, individual precoding matrix selection attempts to maximize the receiver SNR and/or the energy received from a particular cell in a way that does not consider the impact of its own signal as interference to any other cell.

On the other hand, various aspects of the present disclosure may utilize joint precoding matrix selection, and accordingly may additionally consider the interference of one cell upon another cell as a factor in the selecting of the precoding matrix. As compared to the individual precoding matrix selection, joint precoding matrix selection can provide improved performance, as interference of opposing cells is considered.

In some aspects of the disclosure, the joint selection of the precoding matrices may be performed by the UE 510, or by one or more processors 612 resident at the UE 510. That is, the UE 510 may determine a characteristic of each respective downlink MIMO transmission in a multi-flow radio access network, and utilize these characteristics to determine precoding matrices to be utilized for subsequent MIMO transmissions.

Information relating to the jointly selected precoding matrices may be transmitted as feedback on an uplink transmission from the UE 510, e.g., on the HS-DPCCH, in a precoding control indicator (PCI). In some examples, the PCI in a single transmission on the HS-DPCCH may include precoding matrix information for both MIMO transmissions. In other examples, the PCI in a single transmission on the HS-DPCCH may include precoding matrix information for one or the other MIMO transmission.

In additional examples according to aspects of the present disclosure, the joint selection of the precoding matrices may involve processing at the Node B (e.g., Node B 502 and/or 504). That is, to reduce the precoding matrix selection feedback required from the UE 510, and for better interference alignment, the Node B 502 and/or 504 may assist in the joint selection of precoding matrices for the downlink transmissions. In this example, the UE 510 may be adapted to transmit feedback information corresponding to one or metrics based on the respective MIMO transmissions from Cell A 514 and Cell B 516, such that a receiving Node B (e.g., one or both of Node Bs 502 and/or 504) may calculate a precoding matrix to utilize for a subsequent MIMO transmission.

To determine the most favorable combination of precoding matrices to select for the respective cells, in some aspects of the disclosure, an exhaustive test of each available combination of precoding matrices may be performed. For example, each cell may transmit a MIMO downlink according to each combination, and the UE may thereby determine which combination results in the most favorable characteristics.

Figure 10:
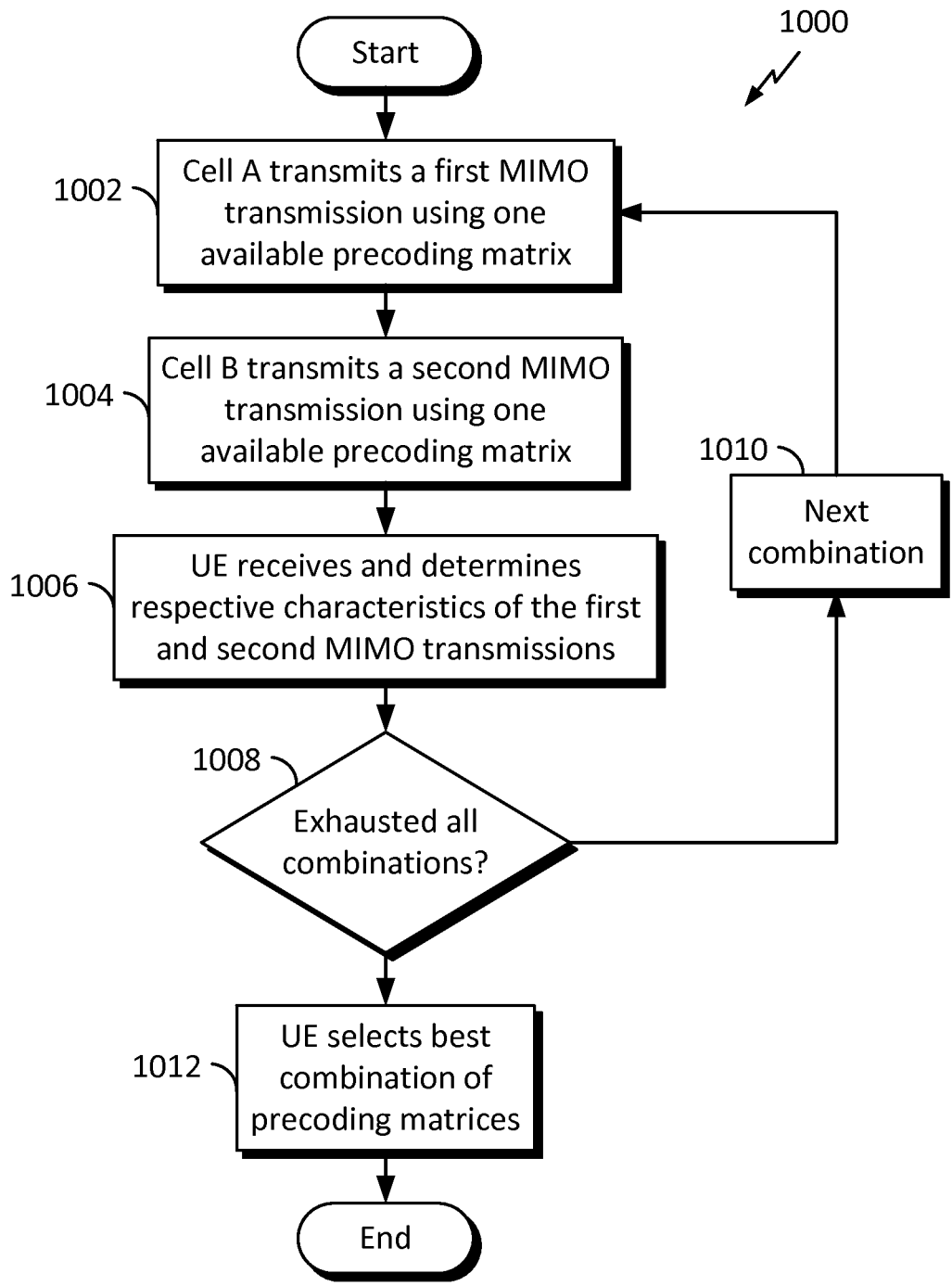
FIG. 10 is a flow chart illustrating a process for jointly selecting an optimal combination precoding matrices according to one example.

FIG. 10 is a flow chart illustrating this exhaustive process for determining precoding matrices in accordance with some aspects of the present disclosure. When the procedure begins, it is assumed that an available precoding matrix is selected for each cell. Here, at step 1002, Cell A 514 may transmit a first MIMO transmission utilizing one available precoding matrix, and at step 1004, Cell B 516 may transmit a second MIMO transmission utilizing one available precoding matrix. In various examples, steps 1002 and 1004 may be performed concurrently or at different times. However, concurrent performance may be advantageous in that the mutual interference may be better determined. At step 1006, the UE 510 may receive and determine respective characteristics of the first and second MIMO transmissions, and in some examples, the characteristics may be stored in a memory 618. At step 1008, the UE may determine if all possible combinations of precoding matrices have been exhausted; if not, then at step 1010 the UE may select the next combination of precoding matrices and in some examples may transmit that combination to one or both of the cells for use in the next iteration. The process between steps 1002 and 1008 may then repeat until every available combination of precoding matrices has been exhausted. Once it is determined that all available combinations of precoding matrices have been exhausted, the process may proceed to step 1012 wherein the UE 510 may select the best combination of precoding matrices. That is, the UE 510 may analyze the stored characteristics determined during each iteration at step 1006 and select the combination of precoding matrices that resulted in the most favorable signal characteristics.

However, in some circumstances, the transmission of each combination of precoding matrices to test each one's favorability may be relatively wasteful of resources, and accordingly may not be desirable. Therefore, in some aspects of the present disclosure the UE 510 may predict the most favorable combination of precoding matrices for subsequent MIMO transmissions from the respective cells based on determined characteristics of previously received MIMO transmissions, such as but not limited to channel quality, measurements of interference, SNR, received power, or any other suitable signal characteristics.

Figure 11:
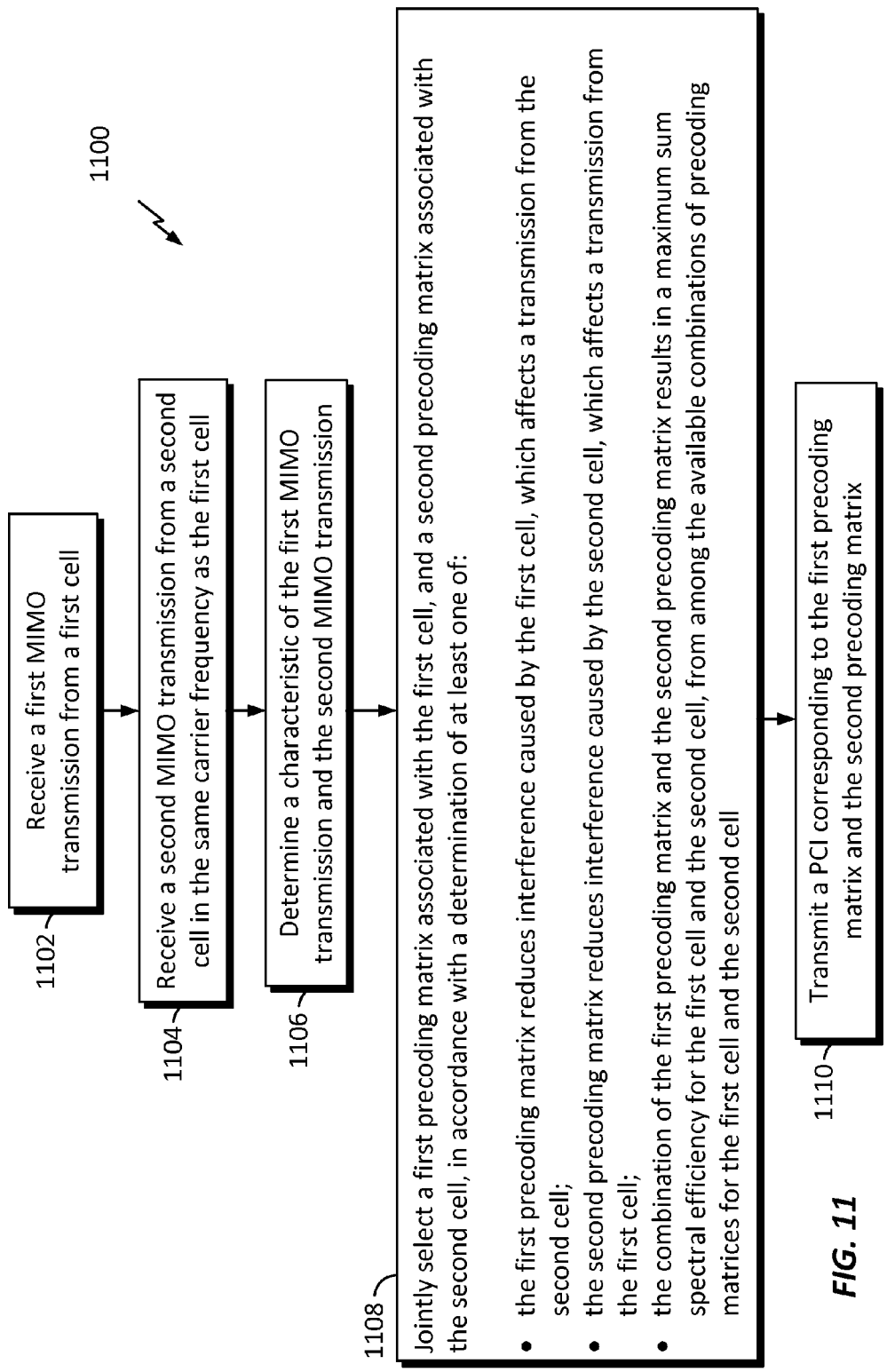
FIG. 11 is a flow chart illustrating a process for jointly selecting an optimal combination precoding matrices according to another example.

FIG. 11 is a flow chart illustrating a process operable at a UE 510 for jointly selecting precoding matrices for use by a first cell and a second cell configured to transmit MIMO multi-flow service to the UE 510. Here, at step 1102 the UE 510 may receive a first MIMO transmission from a first cell 514 (e.g., a primary serving cell), and at step 1104 the UE 510 may receive a second MIMO transmission from a second cell 516 (e.g., a secondary serving cell), wherein the second MIMO transmission may utilize the same carrier frequency as the first MIMO transmission as in a SF-DC radio access network. At step 1106, the UE 510 may determine one or more characteristics of each of the first and second MIMO transmissions, such as received signal strength, a signal to noise ratio, various measurements of interference, etc. For example, any suitable component of the receiver at the UE 510 may work independent of, or in coordination with the processor 612 to determine the one or more characteristics of the respective MIMO transmissions.

Based on the determined characteristics, at step 1108, the UE 510 may jointly select precoding matrices associated with the first cell 514 and the second cell 516. Here, in some aspects of the disclosure, the selection of the precoding matrices may be coordinated with one or both the cells, or may be independently determined by the UE 510. The joint selection of the respective precoding matrices may be made from among a plurality of possible combinations of precoding matrices. For example, if there are four possible precoding matrices that might be utilized at each cell, then there are 16 possible combinations of precoding matrices between the first cell 514 and the second cell 516.

The determination of the most favorable combination of precoding matrices may be made in accordance with one or more factors. For example, the precoding matrices may be selected to reduce interference caused by the transmitting cell, which affects transmissions from the opposing cell. That is, some precoding matrices may interfere with transmissions from the opposing cell more than other precoding matrices, and the precoding matrix may be selected accordingly. Further, the combination of precoding matrices may be selected to increase the sum power or spectral efficiency from both cells received at the UE.

In some aspects, the selection of the combination of the first and second precoding matrices may not necessarily maximize or optimize the received power, or minimize the interference caused by a particular transmission, but may be based on a determination of a desirable combination or trade-off between reduced interference and improved received signal energy. That is, various weighting factors may be utilized to determine relative importance of the interference reduction and power increase.

Once the precoding matrices are selected, the process may proceed to step 1110 wherein the UE 510 may transmit one or more PCIs corresponding to the first precoding matrix and the second precoding matrix, such that the respective Node Bs corresponding to Cell A 514 and Cell B 516 may utilize the selected precoding matrices.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment, comprising:
   receiving a first multiple-input, multiple-output (MIMO) transmission from a first cell;
   receiving a second MIMO transmission from a second cell;
   determining a first characteristic of the first MIMO transmission and a second characteristic of the second MIMO transmission; and
   jointly selecting a first precoding matrix associated with the first cell and a second precoding matrix associated with the second cell, in accordance with the first characteristic and the second characteristic,
   wherein jointly selecting the first precoding matrix and the second precoding matrix comprises selecting the first precoding matrix and the second precoding matrix from among a plurality of available combinations of precoding matrices associated with the first cell and the second cell, respectively, and wherein the selected combination of the first precoding matrix and the second precoding matrix is adapted to result in a maximum sum spectral efficiency for the first cell and the second cell, from among the plurality of available combinations of precoding matrices associated with the first cell and the second cell.

2. The method of claim 1, further comprising transmitting feedback information corresponding to the first precoding matrix and the second precoding matrix.

3. The method of claim 1, wherein jointly selecting the first precoding matrix and the second precoding matrix comprises selecting the first precoding matrix to reduce interference caused by the first cell, which affects transmissions from the second cell.

4. The method of claim 3, wherein jointly selecting the first precoding matrix and the second precoding matrix further comprises selecting the second precoding matrix to reduce interference caused by the second cell, which affects transmissions from the first cell.

5. A user equipment configured for operation in a wireless communication network, comprising:
- means for receiving a first multiple-input, multiple-output (MIMO) transmission from a first cell;
- means for receiving a second MIMO transmission from a second cell;
- means for determining a first characteristic of the first MIMO transmission and a second characteristic of the second MIMO transmission; and
- means for jointly selecting a first precoding matrix associated with the first cell and a second precoding matrix associated with the second cell, in accordance with the first characteristic and the second characteristic,
- wherein the means for jointly selecting the first precoding matrix and the second precoding matrix is configured to select the first precoding matrix and the second precoding matrix from among a plurality of available combinations of precoding matrices associated with the first cell and the second cell, respectively, and wherein the selected combination of the first precoding matrix and the second precoding matrix is adapted to result in a maximum sum spectral efficiency for the first cell and the second cell, from among the plurality of available combinations of precoding matrices associated with the first cell and the second cell.

6. The user equipment of claim 5, further comprising means for transmitting feedback information corresponding to the first precoding matrix and the second precoding matrix.

7. The user equipment of claim 5, wherein the means for jointly selecting the first precoding matrix and the second precoding matrix is configured to select the first precoding matrix to reduce interference caused by the first cell, which affects transmissions from the second cell.

8. The user equipment of claim 7, wherein the means for jointly selecting the first precoding matrix and the second precoding matrix further comprises means for selecting the second precoding matrix to reduce interference caused by the second cell, which affects transmissions from the first cell.

9. A user equipment configured for operation in a wireless communication network, comprising:
- at least one processor;
- a receiver coupled to the at least one processor; and
- a memory coupled to the at least one processor,
- wherein the at least one processor is configured to:
  - receive a first multiple-input, multiple-output (MIMO) transmission from a first cell;
  - receive a second MIMO transmission from a second cell;
  - determine a first characteristic of the first MIMO transmission and a second characteristic of the second MIMO transmission; and
  - jointly select a first precoding matrix associated with the first cell and a second precoding matrix associated with the second cell, in accordance with the first characteristic and the second characteristic,
- wherein the at least one processor, being configured to jointly select the first precoding matrix and the second precoding matrix, is further configured to select the first precoding matrix and the second precoding matrix from among a plurality of available combinations of precoding matrices associated with the first cell and the second cell, respectively, and wherein the selected combination of the first precoding matrix and the second precoding matrix is adapted to result in a maximum sum spectral efficiency for the first cell and the second cell, from among the plurality of available combinations of precoding matrices associated with the first cell and the second cell.

10. The user equipment of claim 9, further comprising:
- a transmitter coupled to the at least one processor,
- wherein the at least one processor is further configured to transmit feedback information corresponding to the first precoding matrix and the second precoding matrix.

11. The user equipment of claim 9, wherein the at least one processor, being configured to jointly select the first precoding matrix and the second precoding matrix, is further configured to select the first precoding matrix to reduce interference caused by the first cell, which affects transmissions from the second cell.

12. The user equipment of claim 11, wherein the at least one processor, being configured to jointly select the first precoding matrix and the second precoding matrix, is further configured to select the second precoding matrix to reduce interference caused by the second cell, which affects transmissions from the first cell.

13. A method of wireless communication operable at a user equipment, comprising:
- receiving a first multiple-input, multiple-output (MIMO) transmission from a first cell;
- receiving a second MIMO transmission from a second cell;
- determining a first characteristic of the first MIMO transmission and a second characteristic of the second MIMO transmission; and
- jointly selecting a first precoding matrix associated with the first cell and a second precoding matrix associated with the second cell, in accordance with the first characteristic and the second characteristic,
- wherein jointly selecting the first precoding matrix and the second precoding matrix comprises determining a metric corresponding to an aggregated throughput from the first cell and the second cell for each of a plurality of combinations of precoding matrices associated with the first cell and the second cell, respectively, and selecting a combination of precoding matrices from among the plurality of combinations of precoding matrices in accordance with the determined metric.

14. The method of claim 13, further comprising transmitting feedback information corresponding to the first precoding matrix and the second precoding matrix.

15. The method of claim 13, wherein jointly selecting the first precoding matrix and the second precoding matrix comprises selecting the first precoding matrix to reduce interference caused by the first cell, which affects transmissions from the second cell.

16. The method of claim 15, wherein jointly selecting the first precoding matrix and the second precoding matrix further comprises selecting the second precoding matrix to reduce interference caused by the second cell, which affects transmissions from the first cell.

17. The method of claim 13, wherein selecting the combination of precoding matrices comprises selecting the combination of precoding matrices to maximize the aggregated throughput from the first cell and the second cell.

18. A user equipment configured for operation in a wireless communication network, comprising:
- means for receiving a first multiple-input, multiple-output (MIMO) transmission from a first cell;
- means for receiving a second MIMO transmission from a second cell;
- means for determining a first characteristic of the first MIMO transmission and a second characteristic of the second MIMO transmission; and means for jointly selecting a first precoding matrix associated with the first cell and a second precoding matrix associated with the second cell, in accordance with the first characteristic and the second characteristic, wherein the means for jointly selecting the first precoding matrix and the second precoding matrix comprises means for determining a metric corresponding to an aggregated throughput from the first cell and the second cell for each of a plurality of combinations of precoding matrices associated with the first cell and the second cell, respectively, and means for selecting a combination of precoding matrices from among the plurality of combinations of precoding matrices in accordance with the determined metric.

19. The user equipment of claim 18, further comprising means for transmitting feedback information corresponding to the first precoding matrix and the second precoding matrix.

20. The user equipment of claim 18, wherein the means for jointly selecting the first precoding matrix and the second precoding matrix is configured to select the first precoding matrix to reduce interference caused by the first cell, which affects transmissions from the second cell.

21. The user equipment of claim 20, wherein the means for jointly selecting the first precoding matrix and the second precoding matrix further comprises means for selecting the second precoding matrix to reduce interference caused by the second cell, which affects transmissions from the first cell.

22. The user equipment of claim 18, wherein the means for selecting the combination of precoding matrices is configured to select the combination of precoding matrices to maximize the aggregated throughput from the first cell and the second cell.

23. A user equipment configured for operation in a wireless communication network, comprising:
at least one processor;
a receiver coupled to the at least one processor; and
a memory coupled to the at least one processor,
wherein the at least one processor is configured to:
receive a first multiple-input, multiple-output (MIMO) transmission from a first cell;
receive a second MIMO transmission from a second cell;
determine a first characteristic of the first MIMO transmission and a second characteristic of the second MIMO transmission; and
jointly select a first precoding matrix associated with the first cell and a second precoding matrix associated with the second cell, in accordance with the first characteristic and the second characteristic, wherein the at least one processor, being configured to jointly select the first precoding matrix and the second precoding matrix, is further configured to determine a metric corresponding to an aggregated throughput from the first cell and the second cell for each of a plurality of combinations of precoding matrices associated with the first cell and the second cell, respectively, and select a combination of precoding matrices from among the plurality of combinations of precoding matrices in accordance with the determined metric.

24. The user equipment of claim 23, further comprising:
a transmitter coupled to the at least one processor,
wherein the at least one processor is further configured to transmit feedback information corresponding to the first precoding matrix and the second precoding matrix.

25. The user equipment of claim 23, wherein the at least one processor, being configured to jointly select the first precoding matrix and the second precoding matrix, is further configured to select the first precoding matrix to reduce interference caused by the first cell, which affects transmissions from the second cell.

26. The user equipment of claim 25, wherein the at least one processor, being configured to jointly select the first precoding matrix and the second precoding matrix, is further configured to select the second precoding matrix to reduce interference caused by the second cell, which affects transmissions from the first cell.

27. The user equipment of claim 23, wherein the at least one processor, being configured to select the combination of precoding matrices, is further configured to select the combination of precoding matrices to maximize the aggregated throughput from the first cell and the second cell.

* * * * *